United States Patent
Kimes

[11] Patent Number: 5,830,098
[45] Date of Patent: Nov. 3, 1998

[54] PLANETARY GEAR ARRANGEMENT WITH A LUBRICATION CONTROL STRUCTURE

[75] Inventor: John William Kimes, Wayne, Mich.

[73] Assignee: General Motors Corporation, Detroit, Mich.

[21] Appl. No.: 870,764

[22] Filed: Jun. 6, 1997

[51] Int. Cl.⁶ .............................. F16H 57/04; F16H 57/10
[52] U.S. Cl. ........................................ 475/159; 475/346
[58] Field of Search .................................. 475/159, 160, 475/346, 348

[56] References Cited

U.S. PATENT DOCUMENTS

| | | | |
|---|---|---|---|
| 2,408,336 | 9/1946 | Orr | 475/159 |
| 2,591,743 | 4/1952 | Thompson | 475/346 |
| 2,681,126 | 6/1954 | Searls | 475/159 X |
| 2,877,668 | 3/1959 | Kelbel | 475/159 X |
| 3,610,072 | 10/1971 | Grimpe | 475/346 |
| 4,759,234 | 7/1988 | Premiski et al. | 475/346 |
| 4,848,177 | 7/1989 | Miura et al. | 475/159 X |
| 4,920,828 | 5/1990 | Kameda et al. | 475/159 X |
| 5,368,528 | 11/1994 | Farrell | 475/348 |
| 5,643,126 | 7/1997 | Hotta et al. | 475/159 |
| 5,702,320 | 12/1997 | Brassai et al. | 475/159 |

*Primary Examiner*—Khoi Q. Ta
*Attorney, Agent, or Firm*—Donald F. Scherer

[57] ABSTRACT

A planetary gear arrangement has one or more planetary gear sets each having a carrier assembly in which a plurality of pinion gears are rotatably mounted on pins supported in a carrier housing. An annular lube dam is attached to the carrier housing and includes a first and second annular sidewall portions extending radially inward and joined by an axial wall portion. The radially innermost sidewall portion directs lubrication fluid to the support pins for delivery to the pinion gears. The axial wall engages notched portions on the pins to ensure the angular orientation of the lube passages formed in the pins. The outermost annular wall portion provides a thrust washer bearing surface between the carrier assembly and an adjacent transmission component to support relative rotation therebetween.

3 Claims, 1 Drawing Sheet

PLANETARY GEAR ARRANGEMENT WITH A LUBRICATION CONTROL STRUCTURE

TECHNICAL FIELD

This invention relates to planet carrier assemblies having lubrication flow control structures.

BACKGROUND OF THE INVENTION

Planetary gear arrangements have at least one planetary carrier assembly which includes a spider or housing for rotatably supporting a plurality of pinion gears. Generally, the pinion gears are rotatably supported by bearings on stationary pins. The bearings require lubrication during operation. The lubrication flow is often by way of passages formed in the pins which must be properly oriented.

The carrier assembly usually supported for relative rotation with axially adjacent components. One or more thrust washers are disposed between the carrier housing and the axially adjacent component. In prior art arrangements, these desired functions, for example, lube control, pin orientation and thrust support, are provided by separate structural devices. For example, pin orientation is established by a staking process or a distinct structure formed on the carrier housing; the lube flow is directed by passages formed in the carrier housing and the thrust support is provided by a conventional thrust washer placed between the components during assembly. These require separate operations and/or structures, all of which add cost to the end product.

SUMMARY OF THE INVENTION

It is an object of the present invention to provide an improved planetary gear assembly with a lubrication flow directing structure.

In one aspect of this invention, a planet carrier housing has an outer rim on which an annular lube dam is secured by tabs on the lube dam and a notch in the outer rim.

In another aspect of this invention, the lube dam has radially inner and outer annular portions joined by an axially extending annular portion wherein the inner annular portion provides a lube collection space for fluid to be delivered to the gear support pins in the carrier housing.

In yet another aspect of this invention, the axial joining portion and the outer annular portion of the lube dam cooperate with the support pins to provide proper angular and longitudinal orientation of the pins for proper delivery of the lubrication fluid to the gears supported thereon.

In a further aspect of this invention, either or both of the inner and outer annular portions provide a thrust bearing structure to accommodate relative rotation between the carrier housing and adjacent rotating or stationary components.

DESCRIPTION OF AN EXEMPLARY EMBODIMENT

Figure 1:
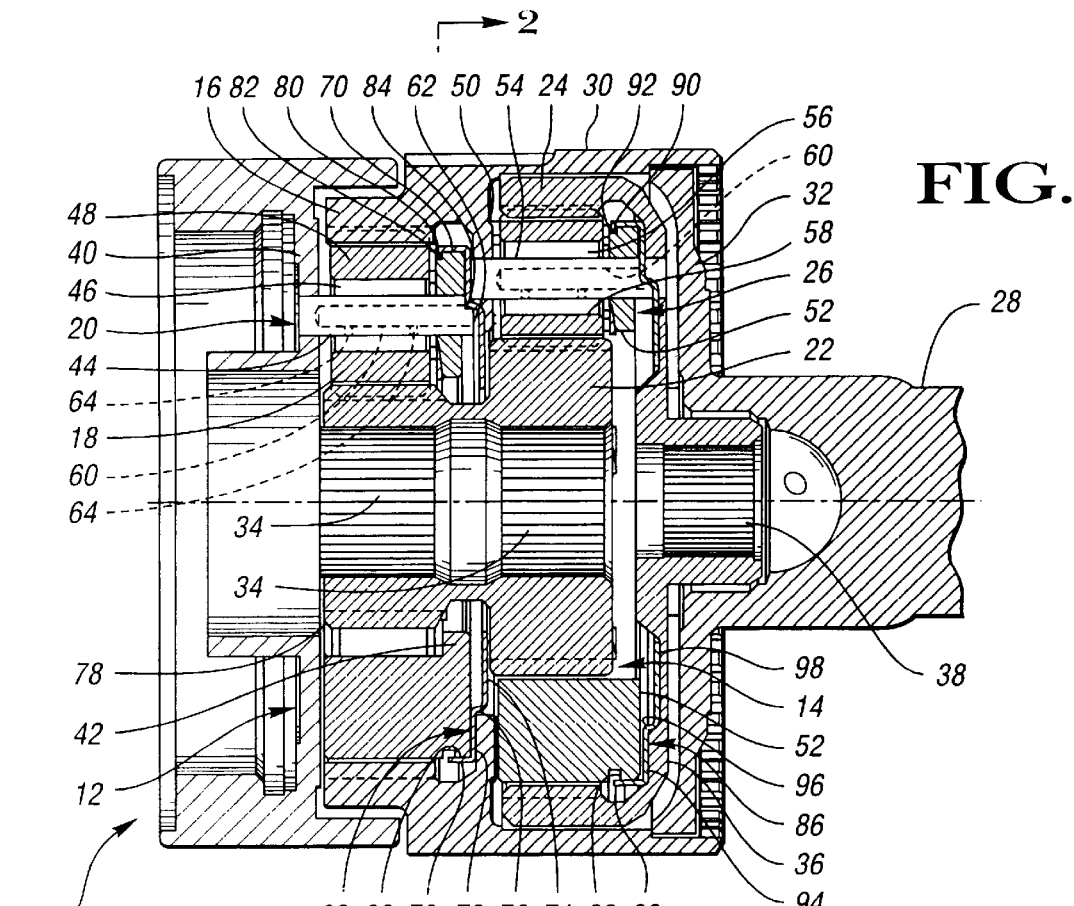
FIG. 1 is a cross-sectional elevational view of a planetary assembly incorporating the present invention.
Figure 2:
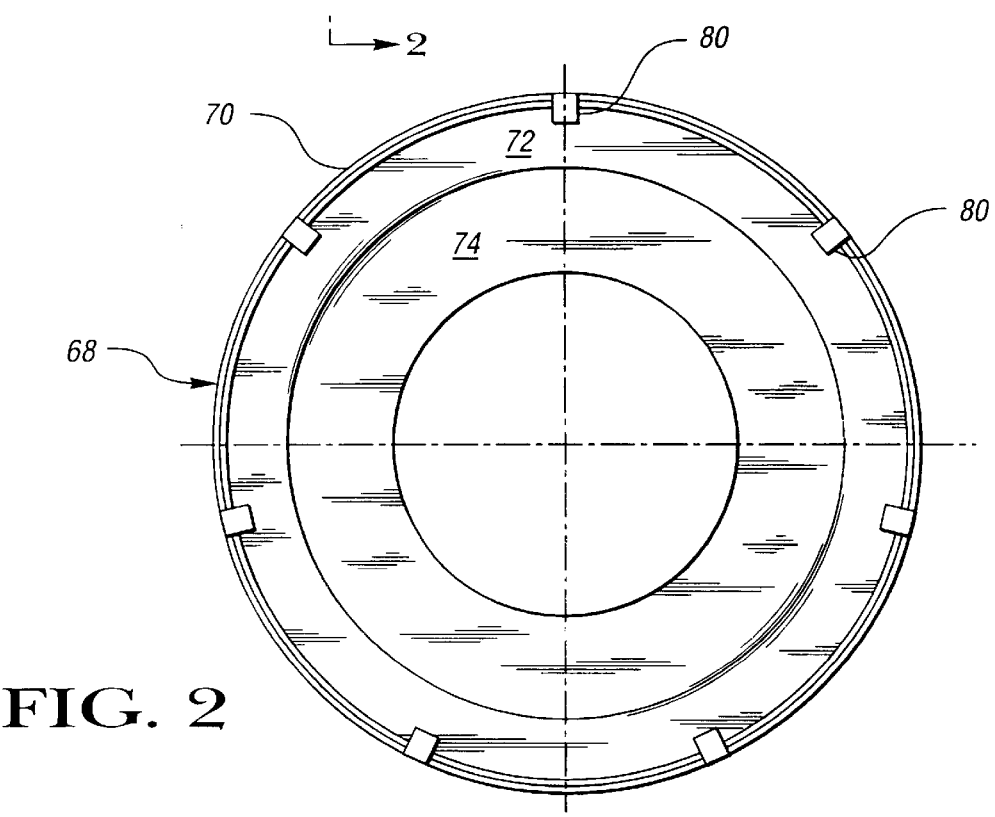
FIG. 2 is a view taken along line 2—2 in FIG. 1.

Referring to drawings, there is seen in FIG. 1 a planetary gear arrangement 10 having a pair of planetary gear sets 12 and 14. The planetary gear set 12 includes a ring gear 16, a sun gear 18 and a planet carrier assembly 20. The sun gear 18 is formed integral with a sun gear 22 of the planetary gear set 14 which also includes a ring gear 24 and a carrier assembly 26.

The ring gear 16 has secured therewith a hub 30 which is also secured with the carrier assembly 26. The hub 30 is drivingly connected with a plate 32 which, in turn, is connected to or integral with a transmission output shaft 28. Thus, both the ring gear 16 and the carrier assembly 26 are connected with the transmission output shaft 28.

The sun gears 18 and 22 have splines 34 formed on their inner surfaces. The splines are adapted to engage or mesh with an input shaft to the planetary gear arrangement 10. The ring gear 24 has integrally formed therewith a hub 36 which has an inner spline surface 38. The spline surface 38 is also adapted to be disposed in mesh with a transmission input shaft.

The carrier assembly 20 includes a carrier housing 40 which is secured to a side plate and separator structure 42. The housing 40 and side plate 42 are joined by pins 44 on which is rotatably disposed a bearing 46. The bearing 46 supports a pinion gear 48 which is disposed in meshing relationship with the sun gear 18 and the ring gear 16.

The carrier assembly 26 includes a carrier housing 50 and a side plate and separator structure 52 which are connected with pin members 54. A bearing 56 is rotatably disposed on the pin member 54 to provide support for a pinion gear 58 which meshes with the ring gear 24 and the sun gear 22. The pins 44 and 54 are essentially identical in structure, such that a description of one will suffice to adequately describe both pins. It should also be appreciated that the carrier assembly 20 or 26 will have a plurality of such pin and pinion gear members. The number of pins and pinion gears will generally be in the range of three or four.

The pin 44 has a central passage 60 which opens at a right end 62 of the pin 44. One or more radial passages 64 communicate the outer circumference of the pin 44 with the central passage 60. The same numerical designations have been given to similar structures on the pin 54.

The side plate 42 has an outer annular edge 66 on which is supported a lube dam 68. The lube dam 68 has an outer rim portion 70, a pair of radially extending annular wall portions 72 and 74, and an axially extending wall portion 76. The annular wall portion 72 is formed integral with the rim 70 and the axial extending wall portion 76 is formed integrally between the walls 72 and 74. Thus, the wall 72 is an outermost radial wall and the wall 74 is an innermost radial wall. The wall 74 terminates in close adjacent relationship with teeth 78 of the sun gear 18.

During operation, lubrication fluid is directed to the sun gear 18. The lubrication fluid upon leaving the sun gear 18 is directed radially outward adjacent the annular wall 74 due to the centrifugal force. The annular wall 74 directs the fluid thus dispensed from the sun gear 18 outward for delivery to the central passage 60. From the central passage 60, the fluid is distributed radially inward through the passages 64 to be dispensed on the bearing 46 for lubrication thereof.

The rim 70 of the lube dam 68 has formed thereon a plurality of tabs 80 which are disposed in a recess or notch 82 formed on the side plate 42 adjacent the edge 66. The tabs 80 cooperate with the notch 82 to secure the lube plate to the side plate 42. The pin 44 has formed in the right end 62 thereof a notch 84 which is positioned angularly by the axially extending portion 76 of the lube dam 68. Thus, the lube dam 68 maintains the position of the pin 44 such that the radially passages 64 are disposed to dispense fluid radially inward to the bearing 46.

The annular wall 72 provides a thrust surface or bearing to support rotational speed differences between the carrier assemblies 20 and 26. During assembly, the pin 44 is pressed into the housing 40 and is prevented from moving rightward by the wall 72 and the axially extending portion 76 of the lube dam 68.

The carrier assembly 26 also has secured thereon a lube dam 86 which is similar in structure to the lube dam 68 but is larger radially than the lube dam 68. The lube dam 86 includes a rim 88 which has formed integrally therewith a plurality of tabs 90 secured in a notch 92 formed in the side plate 52. Also integral with the rim 88 is an annular wall 94 which is, in turn, formed integral with an axially extending wall 96 which, in turn, is formed integral with an annular wall 98. The annular wall 98 provides both a lubrication flow directing surface for the lube dam 68 and a thrust washer surface for the relative rotation between the ring gear 24 and the carrier assembly 26. The radially extending annular wall 94 also provides a thrust bearing surface between the carrier assembly 26 and the ring gear 24.

The inner annular wall 98 collects lubrication fluid which is dispensed from the sun gear 22 for delivery to the central passage 60 of the pin 54. The fluid in the central passage 60 is then distributed by the radially passages 64 to the bearing 56. The wall 96 of the lube dam 86 provides the angular orientation function for the pin 54 similar to the function provided by the axial portion 76 of the lube dam 68.

It should be appreciated from the above description that a simple one piece formed member provides a plurality of functions which, in the prior art, are provided by distinct structures formed either in the carrier or assembled separate from the carrier during the process of assembling the planetary gear set. These prior art bearing structures would be represented by washer members which must be placed by hand between the relatively rotating parts. Thus, leaving some room for error by the assembler.

The carrier pins of the prior art would most likely be staked in the housing or in the side plate to ensure the proper orientation and longitudinal positioning of the pins was proper.

The present invention, in the form of the one piece lube dam, provides a much simpler structure which is easier to assemble thereby improving the cost efficiency of the transmission.

While the exemplary embodiment described above has individual tabs 80 and 90 formed on the lube dams 68 and 86, respectively, it is possible to form a continuous portion on the rim which extends radially inward such that the entire edge of the rim is disposed within the respective notches 82 and 92.

I claim:

1. A planetary carrier assembly comprising:

a housing having an annular wall with an outer circumferential edge;

a pin secured in said housing having a central fluid passage closed at one end and having a notch at the another end, a radial passage communicating with said central passage to deliver fluid in said central passage to an outer surface of said pin;

a gear and bearing rotatably supported on said pin in fluid communication with said radial passage;

an dam member supported on said rim comprising first and second annular wall portions, an axially extending portion connecting said annular wall portions and a rim portion supported on said circumferential edge of said housing, said axially extending portion engaging said notch to angularly orient said pin relative to said housing, one of said first and second annular wall portions providing a thrust bearing surface for a component disposed for relative rotation adjacent said carrier assembly.

2. The planetary carrier assembly defined in claim 1 wherein said rim portion has a plurality of tabs and said edge has a plurality of recesses; each said tab being disposed in a respective one of said recesses.

3. The planetary carrier assembly defined in claim 1 wherein said first annular wall is radially outward of said second annular wall and provides an abutment to longitudinally position said pin in said housing.

* * * * *